United States Patent
Sherony et al.

(10) Patent No.: US 9,542,847 B2
(45) Date of Patent: Jan. 10, 2017

(54) LANE DEPARTURE WARNING/ASSISTANCE METHOD AND SYSTEM HAVING A THRESHOLD ADJUSTED BASED ON DRIVER IMPAIRMENT DETERMINATION USING PUPIL SIZE AND DRIVING PATTERNS

(71) Applicant: Toyota Motor Engineering & Manufacturing North America, Inc., Erlanger, KY (US)

(72) Inventors: Rini Sherony, Ann Arbor, MI (US); Hideki Hada, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 7 days.

(21) Appl. No.: 13/968,927

(22) Filed: Aug. 16, 2013

(65) Prior Publication Data
US 2013/0335213 A1 Dec. 19, 2013

Related U.S. Application Data

(63) Continuation-in-part of application No. 13/029,078, filed on Feb. 16, 2011, now abandoned.

(51) Int. Cl.
*B60Q 1/00* (2006.01)
*G08G 1/16* (2006.01)
(Continued)

(52) U.S. Cl.
CPC .............. *G08G 1/167* (2013.01); *B60W 30/12* (2013.01); *B60W 2050/143* (2013.01);
(Continued)

(58) Field of Classification Search
CPC ....... B60Q 9/008; B60W 50/14; B60W 40/09; B60W 30/12; B60W 2050/143; B60W 2540/22; B60W 2540/26; B60W 2540/28; G08B 21/06; G08G 1/16; G08G 1/167
See application file for complete search history.

(56) References Cited

U.S. PATENT DOCUMENTS 5,574,641 A * 11/1996 Kawakami ............. G08B 21/06
180/272
5,769,085 A * 6/1998 Kawakami ............. A61B 5/024
600/519
(Continued)

OTHER PUBLICATIONS

Chang, Tang-Hsien et al. "Irregular Vehicle Behavior Warning Modules"; IEEE Intelligent Vehicles Symposium; pp. 1150-1155; Jun. 13, 2007.
(Continued)

*Primary Examiner* — Amare Mengistu
*Assistant Examiner* — Crystal A Mathews
(74) *Attorney, Agent, or Firm* — Snell & Wilmer LLP

(57) ABSTRACT

A method/system for lane departure warning/assistance that warns the driver that the vehicle is about to leave a current lane and enter an adjacent lane. The driver is identified, and a corresponding profile is accessed. The driver's pupils may be measured and compared to pupil size baseline data stored in the accessed profile. If the difference in pupil size exceeds a pupil size baseline by more than a deviation level, the method/system may adjust a lane departure warning/assistance threshold of a lane departure detector that warns the driver each time the vehicle is getting too close to an adjacent lane, thus alerting the driver that the vehicle may drift into the next lane. Driving patterns, such as steering angles and braking force, may also be used to adjust the lane departure warning/assistance threshold and determine whether the driver may benefit from lane departure warning/assistance.

20 Claims, 13 Drawing Sheets

(51) Int. Cl.
*B60W 30/12* (2006.01)
*B60W 50/14* (2012.01)

(52) U.S. Cl.
CPC ..... *B60W 2540/22* (2013.01); *B60W 2540/26* (2013.01); *B60W 2540/28* (2013.01)

(56) References Cited

U.S. PATENT DOCUMENTS

| | | |
|---|---|---|
| 5,867,587 A | 2/1999 | Aboutalib et al. |
| 6,014,595 A * | 1/2000 | Kobayashi ............... E01F 9/047 |
| | | 340/438 |
| 6,061,610 A | 5/2000 | Boer |
| 6,346,887 B1 | 2/2002 | Van Orden et al. |
| 6,647,328 B2 | 11/2003 | Walker |
| 6,906,639 B2 | 6/2005 | Lemelson et al. |
| 6,927,694 B1 | 8/2005 | Smith et al. |
| 7,071,831 B2 | 7/2006 | Johns |
| 7,091,838 B2 | 8/2006 | Shimakage |
| 7,190,274 B2 * | 3/2007 | Ihara ...................... G08B 21/06 |
| | | 340/439 |
| 7,283,056 B2 | 10/2007 | Bukman et al. |
| 7,301,464 B2 | 11/2007 | Coulter |
| 7,389,178 B2 | 6/2008 | Raz et al. |
| 7,394,392 B1 | 7/2008 | Roe |
| 7,427,924 B2 | 9/2008 | Ferrone et al. |
| 7,444,311 B2 | 10/2008 | Engstrom et al. |
| 7,460,940 B2 | 12/2008 | Larsson et al. |
| 7,479,892 B2 | 1/2009 | Ling et al. |
| 7,639,148 B2 | 12/2009 | Victor |
| 7,663,495 B2 | 2/2010 | Haque et al. |
| 7,689,008 B2 | 3/2010 | Hammoud et al. |
| 7,705,738 B2 | 4/2010 | Fukaya et al. |
| 8,190,329 B2 | 5/2012 | Kawakami et al. |
| 2002/0128751 A1 * | 9/2002 | Engstrom ....... B60W 30/18181 |
| | | 701/1 |
| 2003/0229447 A1 | 12/2003 | Wheatley et al. |
| 2005/0128092 A1 * | 6/2005 | Bukman ................... A61B 5/18 |
| | | 340/576 |
| 2005/0182551 A1 | 8/2005 | Sugano |
| 2006/0025897 A1 * | 2/2006 | Shostak ................ B60C 23/005 |
| | | 701/1 |
| 2006/0126901 A1 | 6/2006 | Mattes et al. |
| 2006/0217860 A1 * | 9/2006 | Ihara .................... B62D 15/025 |
| | | 701/41 |
| 2006/0217861 A1 * | 9/2006 | Ihara .................... B62D 15/029 |
| | | 701/41 |
| 2007/0069874 A1 * | 3/2007 | Huang ................. B62D 15/029 |
| | | 340/435 |
| 2007/0124027 A1 | 5/2007 | Betzitza et al. |
| 2007/0164852 A1 * | 7/2007 | Litkouhi ............ B60G 17/0195 |
| | | 340/435 |
| 2007/0192038 A1 * | 8/2007 | Kameyama ........ G01C 21/3641 |
| | | 702/19 |
| 2007/0236662 A1 | 10/2007 | Waldorf et al. |
| 2008/0042813 A1 | 2/2008 | Wheatley et al. |
| 2008/0117384 A1 * | 5/2008 | Inakagata ............... A61B 3/111 |
| | | 351/243 |
| 2008/0119994 A1 * | 5/2008 | Kameyama ........... B60W 40/08 |
| | | 701/48 |
| 2008/0252466 A1 * | 10/2008 | Yopp ..................... B60K 28/066 |
| | | 340/576 |
| 2009/0041309 A1 * | 2/2009 | Kim ................... G06K 9/00604 |
| | | 382/117 |
| 2009/0063201 A1 | 3/2009 | Nowotarski et al. |
| 2009/0091435 A1 | 4/2009 | Bolourchi |
| 2009/0219161 A1 * | 9/2009 | Kocher .................. B60K 28/06 |
| | | 340/576 |
| 2009/0261979 A1 | 10/2009 | Breed et al. |
| 2009/0299630 A1 * | 12/2009 | Denaro ........... B60W 30/18009 |
| | | 701/300 |
| 2009/0300067 A1 * | 12/2009 | Denaro ............... B60W 40/072 |
| 2010/0002075 A1 | 1/2010 | Jung et al. |
| 2010/0077421 A1 | 3/2010 | Cohen et al. |
| 2010/0080416 A1 | 4/2010 | Lee et al. |
| 2010/0102972 A1 | 4/2010 | Middlekauff et al. |
| 2010/0108425 A1 | 5/2010 | Crespo et al. |
| 2010/0109881 A1 | 5/2010 | Eskandarian et al. |
| 2010/0152976 A1 | 6/2010 | White et al. |
| 2010/0201896 A1 * | 8/2010 | Ostreko ..................... B60R 1/12 |
| | | 349/1 |
| 2010/0295707 A1 | 11/2010 | Bennie et al. |
| 2011/0082625 A1 * | 4/2011 | Miller ..................... B60R 25/00 |
| | | 701/45 |
| 2011/0090075 A1 | 4/2011 | Armitage et al. |
| 2012/0045102 A1 * | 2/2012 | Lung ........................ G06K 9/00 |
| | | 382/117 |
| 2012/0233841 A1 * | 9/2012 | Stein ...................... G03B 17/02 |
| | | 29/428 |
| 2012/0271484 A1 | 10/2012 | Feit et al. |

OTHER PUBLICATIONS

"An Evaluation of Emerging Driver Fatigue Detection Measures and Technologies"; Federal Motor Carrier Safety Administration; 52 pages; Jun. 2009.

"A Fast and Effective Approach to Lane Marking and Neighboring Vehicles Detections Based on Vision/GPS Sensing Together with Vehicle-to-Vehicle Communication", IEEE; pp. 3-8; 2009.

Hupe, Jean-Michel; Lamirel, Cedric; Lorenceu, Jean; "Pupil dynamics during bistable motion perception;" Jul. 15, 2009; Journal of Vision; pp. 1-19.

S.A. Ferguson et al., "Driver Alcohol Detection System for Safety (DADSS). Background and Rationale for Technology Approaches", SAE International, Jan. 1, 2010, 13 pages.

T. Shirakata et al., "Detect the Imperceptible Drowsiness", SAE International, Passeng. Cars—Electron. Electr. Syst., vol. 3, Issue 1, Apr. 12, 2010, pp. 98-108.

* cited by examiner

LANE DEPARTURE WARNING/ASSISTANCE METHOD AND SYSTEM HAVING A THRESHOLD ADJUSTED BASED ON DRIVER IMPAIRMENT DETERMINATION USING PUPIL SIZE AND DRIVING PATTERNS

CLAIM OF PRIORITY UNDER 35 U.S.C. §120

The present Application for Patent claims priority from and is a continuation-in-part application of co-pending U.S. patent application Ser. No. 13/029,078, entitled "Lane Departure Warning System," filed Feb. 16, 2011, and assigned to the assignee hereof and hereby expressly incorporated by reference herein.

BACKGROUND

Field

The present invention describes methods, devices, and/or systems related to lane departure warning/assistance systems. For example, a lane departure warning/assistance system may warn a driver that the vehicle may be on the verge of leaving the current lane of a road and entering an adjacent lane of the road. For example, the lane departure warning/assistance system may further provide assistance to the driver.

Description of Related Art

Various systems are being developed to prevent people from driving under the influence of alcohol. For example, some automobile manufacturers are currently exploring the possibility of integrating a breathalyzer test into the vehicle which a driver must pass in order to start the engine. However, such active deterrent systems may be further supplemented and/or replaced by other systems.

SUMMARY

This Summary is included to introduce, in an abbreviated form, various topics to be elaborated upon below in the Detailed Description. This Summary is not intended to identify key or essential aspects of the claimed invention. This Summary is similarly not intended for use as an aid in determining the scope of the claims.

Devices, systems, and methods discussed herein relate to a lane departure warning/assistance system ("the system") that warns the driver when the vehicle is beginning to drift towards the lane markers (i.e., to guard against unintentionally drifting out of the current lane and into an adjacent lane). As used herein, intoxication or intoxicated, whether used in connection with impairment or not, is defined to include any type of impairment (e.g., resulting from alcohol, drugs, and/or other substances) and may further cover other situations where the driver is not legally impaired but assistance to the driver may be desirable nonetheless. For example, in an exercise of caution and to promote safety, intoxication of a driver may include situations where the driver is deemed by the system to be impaired even if the driver is well below legally allowable limits. Moreover, the concepts described herein may further be applicable to determine if a driver's driving habits deviate too far from normal driving habits (e.g., deviates from a lane departure warning/assistance threshold by more than a driving habit deviation level), thus suggesting, for example, that the driver is falling asleep, is extremely tired or fatigued, is a new driver, is a careless or reckless driver, is too distracted (e.g., talking on the phone or texting on the phone) or is otherwise not paying enough attention to operating the motor vehicle. "Lane departure warning/assistance threshold," as used herein throughout the application, refers to a lane departure warning threshold or a lane departure assistance threshold. In an embodiment, the lane departure warning threshold is different from the lane departure assistance threshold. For example, the lane departure warning threshold may be more lenient than a lane departure assistance threshold because providing assistance to the driver may correspond to a more significant or active output than warning the driver and accordingly, requiring a higher degree of certainty that the driver indeed requires assistance. In one embodiment, the collected data about the driver may not necessarily correspond to impairment as defined based on legal or scientific principles, and may instead be based on predetermined and learned criteria useful for adjusting a lane departure warning/assistance threshold of the lane departure warning/assistance system.

In one embodiment, a lane departure warning/assistance system provides lane departure assistance or issues lane departure warnings by comparing lane departure of the vehicle to the lane departure warning/assistance threshold. The lane departure warning/assistance threshold is adjusted based on the impairment determination. As such, an advantageous feature of utilizing an adjusted threshold is decreasing the likelihood of falsely warning a non-impaired driver, thereby avoiding unnecessary disruptions. Furthermore, an advantageous feature of utilizing the adjusted lane departure warning/assistance threshold is that impaired drivers would be subjected to lane departure warning/assistance at an early juncture in an attempt to decrease the likelihood of accidents caused by impaired drivers.

In one embodiment, a lane departure warning/assistance system may determine if the driver may benefit from lane departure warning or assistance (e.g., intoxicated, impaired, or distracted). If the driver is deemed to be in need of warning or assistance, a lane departure detector (a subsystem of the lane departure warning/assistance system) may warn or assist the driver each time the vehicle moves too close to the lane marker, as studies have shown that accidents may be reduced if the driver is warned or assisted before unintentionally entering into an adjacent lane.

In one embodiment, the driver of the vehicle is identified, and a corresponding profile is accessed. The driver's pupils may be measured and compared to pupil size data stored in the accessed profile. If the difference in pupil size exceeds a certain pupil size baseline by more than a pupil size deviation level (e.g., 5%), then the vehicle may adjust a lane departure warning/assistance threshold of a passive lane departure detector that warns the driver each time the vehicle is getting too close to an adjacent lane, thus alerting the driver that the vehicle may be unintentionally drifting into the next lane. Additional driving patterns, such as steering angles and braking force, may also be used to determine whether the driver may benefit from lane departure assistance and whether to trigger activation of the lane departure warning/assistance feature of the lane departure detector. In one embodiment, the lane departure detector remains active regardless of the impairment determination, yet the lane departure warning/assistance threshold is adjusted based on the impairment determination. In such an embodiment, a warning or assistance on/off switch or option may be provided to allow a user to activate or deactivate the warning or assistance features of the system.

In one embodiment, if the driver of the vehicle is not identified, the driver may be prompted to create a profile. For example, the driver may be requested to drive for a certain time period to allow the vehicle system to gather data on steering behavior, braking patterns, and the like. In addition, the gathered data may include measuring one or both pupils of the driver's eyes. Even after the initial profile is complete, the system may update the profile by continuing to gather more data regarding the driver's driving patterns, which may improve the system's ability to more accurately respond to changes in the driver's normal operating patterns. In one embodiment, the profile may be used to determine whether the driver may benefit from lane departure assistance.

In one embodiment, the vehicle may receive data from a sensor or a camera directed to lane markers of a lane in which the vehicle is traveling. The data may be used to help determine whether the vehicle is starting to drift too close to the lane marker or is about to cross into an adjacent lane unintentionally. If the system ascertains that the vehicle is too close to the lane marker or is crossing the lane marker, a warning message may be outputted audibly and/or visually to the driver. In addition, the system may provide assistance to the driver.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems, and/or methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1A:
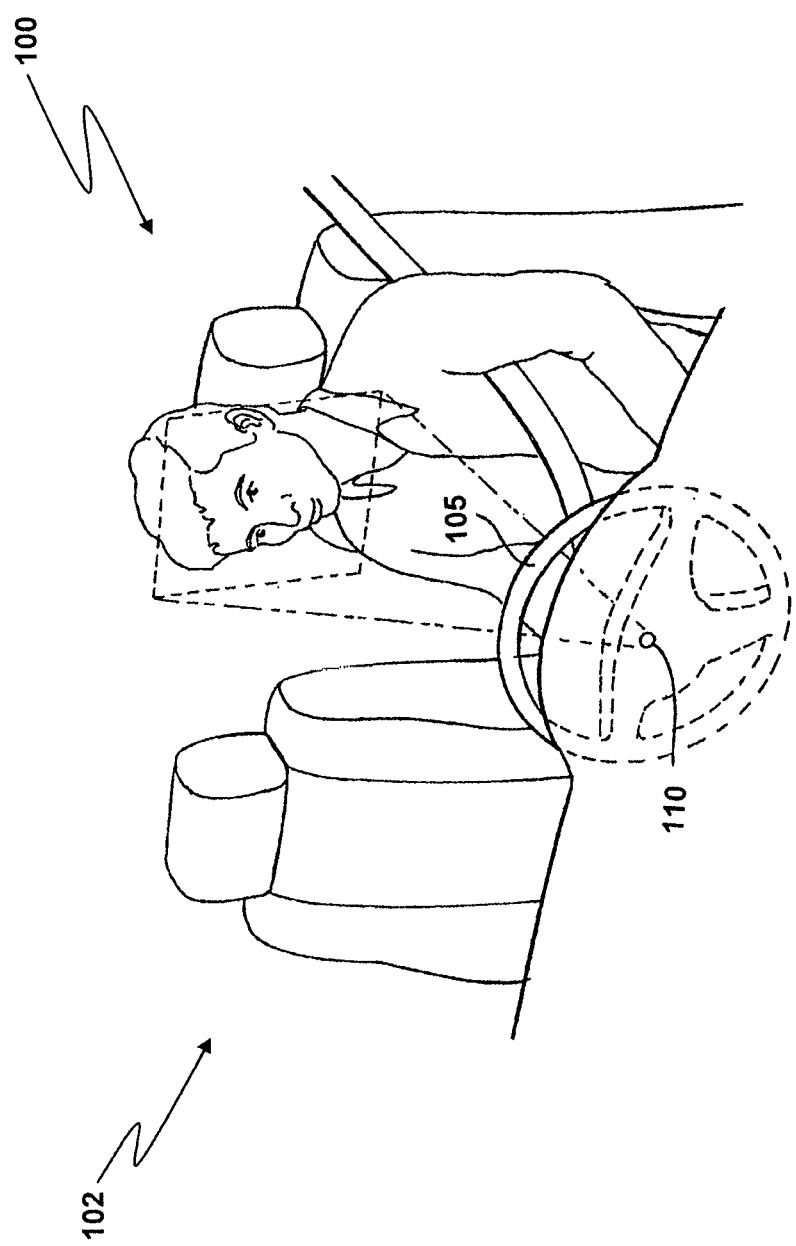
FIG. 1A illustrates a vehicle with a pupil sensor or a camera according to one or more embodiments described herein.

Turning to FIG. 1A, an interior 102 of a vehicle 100 is shown with a person in the driver's seat. In one embodiment, the vehicle interior 102 may include a steering wheel 105 with a camera 110 or other device configured to determine a pupil size. Here, the camera 110 is shown mounted on the steering wheel 105 at a location such as the center. However, the camera 110 may be located anywhere that allows the camera 110 to obtain images of the driver's eyes, and more particularly, the pupils. For example, the camera 110 may be located on the instrument panel of the vehicle interior 102 (e.g., next to the fuel gauges), on the center control panel of the vehicle interior 102 (e.g., near radio/CD player controls), or on the frame or windshield of the vehicle interior 102. While shown as a single camera, the camera 110 may include, in one embodiment, multiple cameras, wherein one or more cameras can focus on a respective eye of the driver.

In one embodiment, four cameras may be used, with two cameras focused on each eye (not shown). Here, a first set of cameras may be located at one location (e.g., steering wheel) and a second set of cameras may be located at a second location (e.g., windshield). The first set of cameras may include at least two cameras, where a first camera is directed to the right eye of the driver and the second camera is directed to the left eye of the driver. Within the second set of cameras, a first camera may be directed to the right eye of the driver and a second camera may be directed to the left eye of the driver. By utilizing multiple cameras, a more accurate determination of the driver's pupil size may be obtained.

Methods of detecting a person's eye and taking images of the eye using a camera (e.g., by using camera 110) are known and any of these methods may be used to obtain images of the driver's eye for measuring the diameter and/or size of the pupil. In one embodiment, the camera 110 may include a wireless transmitter which is configured to transmit image data to a vehicle's control unit via, for example, BLUETOOTH. In another embodiment, the camera 110 may send and receive data from the vehicle's control unit via a hard-wired cable line coupled to the vehicle's controller area network bus (CAN bus).

Figure 1B:
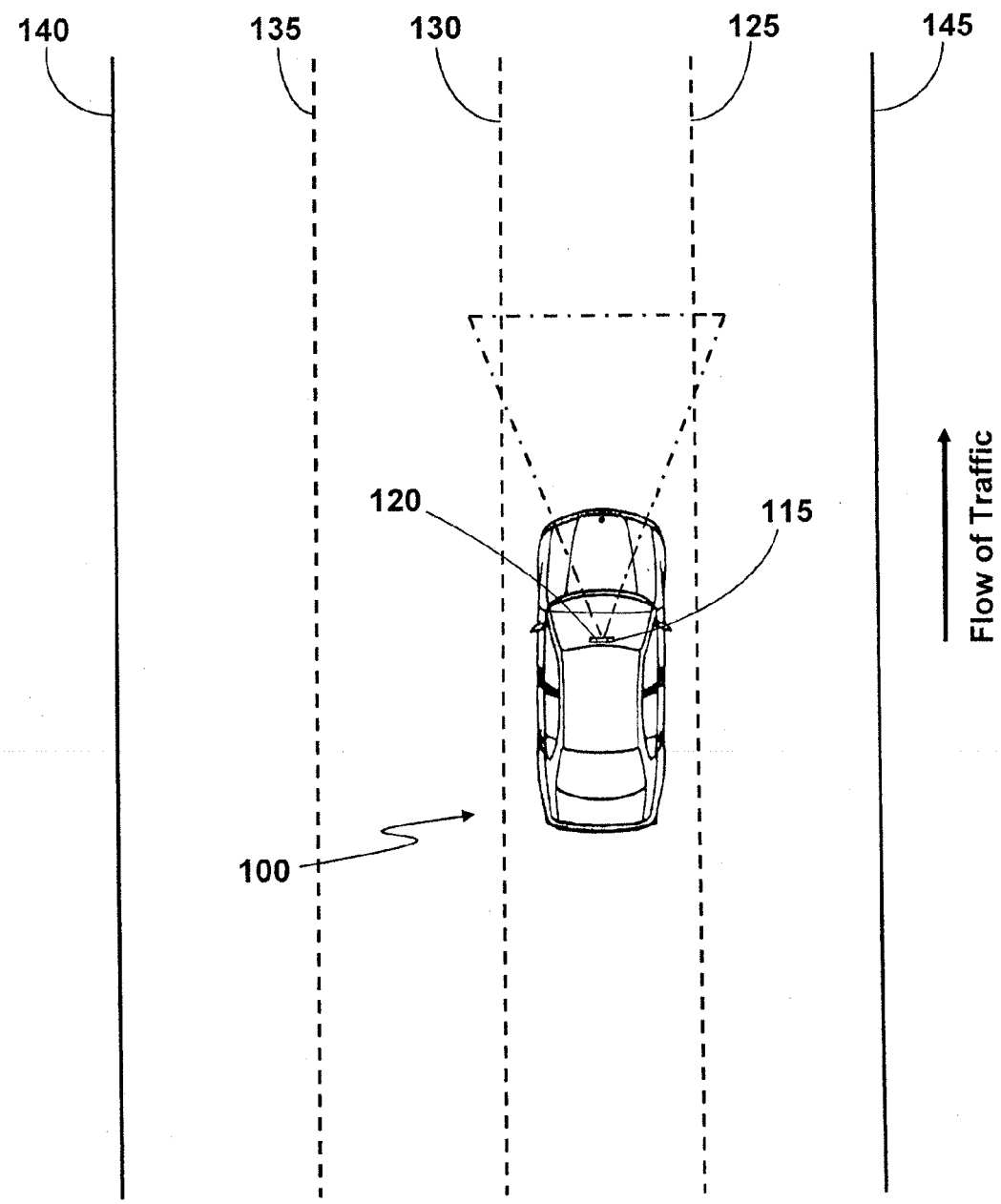
FIG. 1B illustrates a vehicle on a multi-lane road with a lane-marker sensor and/or camera according to one or more embodiments described herein.

FIG. 1B illustrates the vehicle 100 on a road divided into multiple lanes. As an example, the road shown has four generally parallel lanes, including a left-most lane (defined by lane marker 140 and lane marker 135), a left-interior lane (defined by lane marker 135 and lane marker 130), a right-interior lane (defined by lane marker 130 and lane marker 125) and a right-most lane (defined by lane marker 125 and lane marker 145). However, the concepts herein are applicable to roads with any number of lanes.

The vehicle 100 may include a lane detection sensor 115 located, for example, within the vehicle interior 102 (e.g., on the backside of a rear-view mirror 120, or between the rear-view mirror 120 and a windshield). In one embodiment, the lane detection sensor 115 may be placed on the exterior of the vehicle 100 (e.g., on the hood, grill or near the headlamps). The lane detection sensor 115, in one embodiment, may be a camera that faces forward (e.g., the same direction that a driver would face when operating the vehicle) and capable of capturing images of the road, and in particular, the lane markers (e.g., lane markers 125, 130, 135, 140 and 145) of the road. The lane detection sensor 115 may detect the lane markers which define the lane in which the vehicle is traveling (e.g., lane markers 125 and 130) and calculate how close the vehicle 100 is to each of the two lane markers defining the road (e.g., lane markers 125 and 130). In one example, since the lane detection sensor 115 is at a fixed location, a distance between the lane detection sensor 115 and the lane markers of the road (e.g., lane markers 125 and 130) may be calculated from data obtained by the lane detection sensor 115.

In another example, the lane detection sensor 115 is a camera which obtains images of the lane markers (e.g., lane markers 125 and 130). Once the image or images are obtained, a distance between the lane markers (e.g., lane markers 125 and 130) and a point of reference (e.g., position of the lane detection sensor 115) may be calculated by processing the image or images based on, for example, the magnification of the lens, and/or the corresponding size of the other fixed elements captured in the image such as the hood of the vehicle. Image processing may be performed by a processor located within the camera, or performed by a remote image processor, for example, a processor coupled to the vehicle's CAN bus (e.g., processor 250 of FIG. 2B, described below). By calculating the distance to the lane markers from a point of reference (e.g., the location of the lane detection sensor 115), the vehicle system may determine whether the vehicle 100 is near the center of the lane (and thus considered safely situated) or veering too close to one of the lane markers (e.g., as shown in FIG. 1B, whether the vehicle 100 is moving too close to lane marker 125 or 130).

In addition or alternatively, sensors may be utilized to detect magnetic markers, laser or millimeter wave radar transmitters/receivers may be utilized for actively illuminating and measuring positions of markers, and/or a high accuracy GPS receiver may be utilized to assist in the lane departure determination.

Figure 1C:
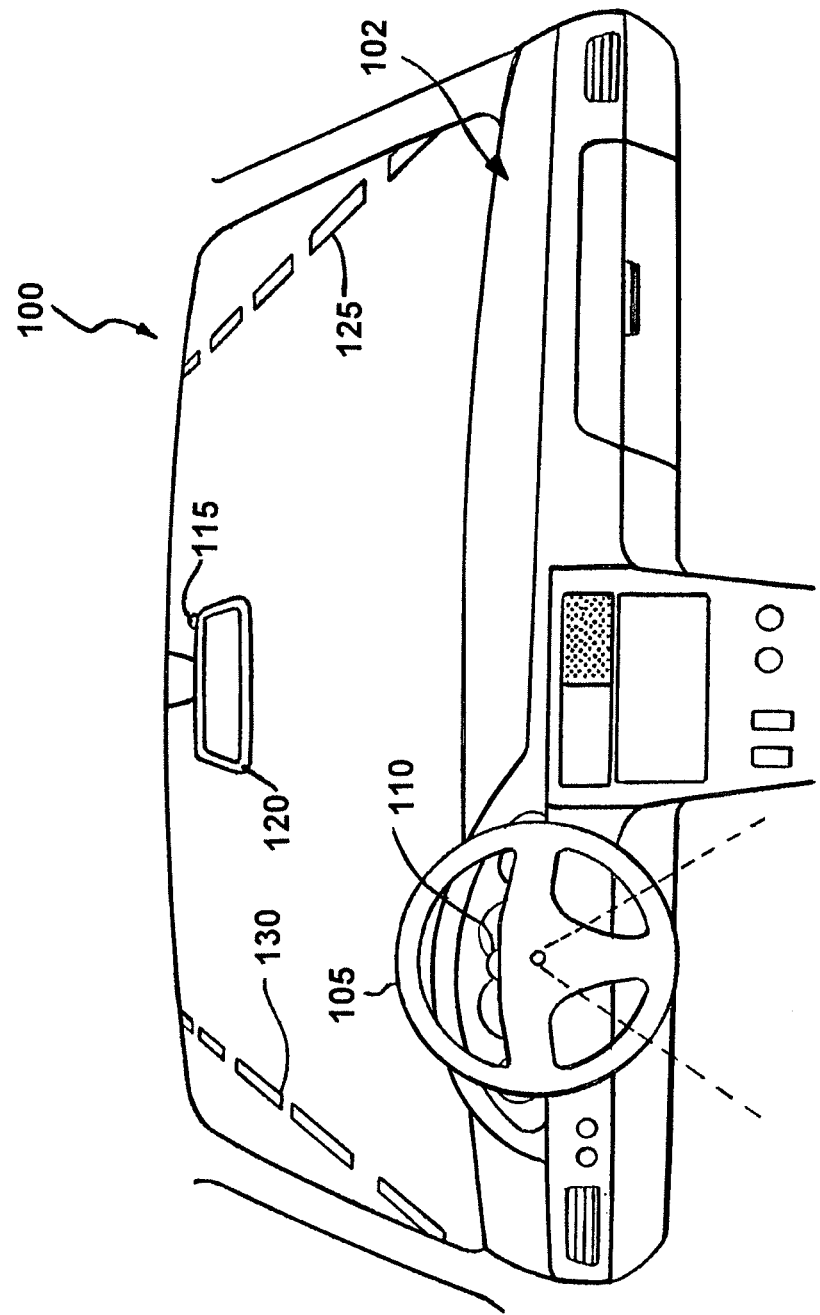
FIG. 1C illustrates a vehicle with both a pupil sensor and/or a camera and a lane-marker sensor and/or a camera according to one or more embodiments described herein.

FIG. 1C illustrates a view of the vehicle interior 102 and the lane markers of the road (e.g., lane markers 125 and 130) through the windshield from the perspective of a driver or a passenger. In this embodiment, the placement of the camera 110 on the steering wheel 105 may be seen in relationship to the lane detection sensor 115 mounted on the rear-view mirror 120. In one embodiment, the camera 110 may be configured to re-position itself if needed, for example, in response to the driver adjusting the position of the steering wheel 105 or the seat. Similarly, the lane detection sensor 115 may be configured to re-position itself in response to the driver adjusting the position of the rear-view mirror 120. For example, the camera 110 and/or the lane detection sensor 115 may be pivotably fixed in a housing which allows panning and tilting. In this manner, the camera 110 and the lane detection sensor 115 may re-position themselves to track the driver's eye and sense the lane markers of the road, respectively.

Figure 2A:
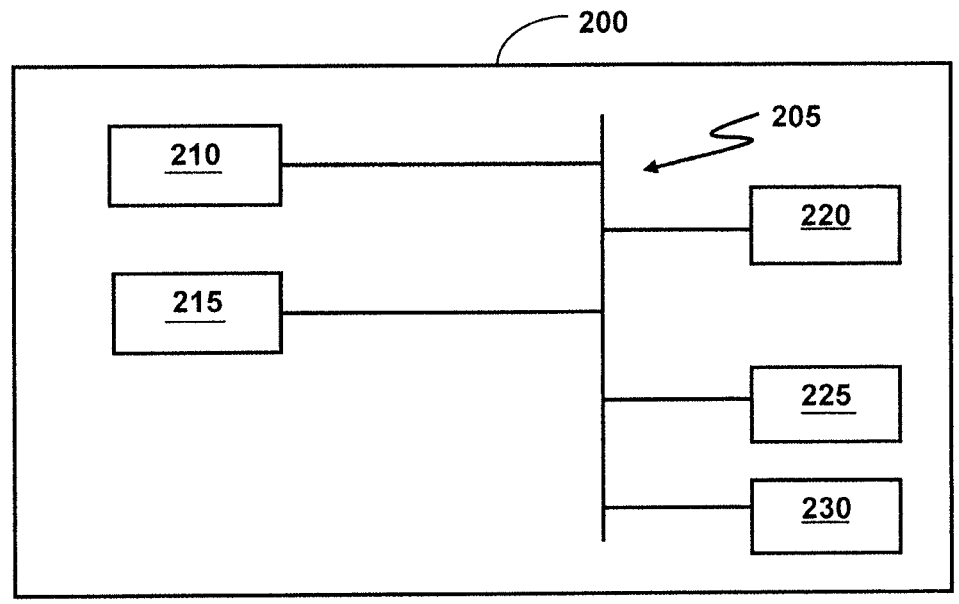
FIG. 2A illustrates a block diagram of a vehicle system including a pupil sensor and/or a camera and a lane-marker sensor and/or a camera according to one or more embodiments described herein.

FIG. 2A is a block diagram illustrating a lane departure warning/assistance system 200. As shown, the lane departure warning/assistance system 200 may include a CAN bus 205 supporting the data transfer between various vehicle components. For example, a camera 210, a lane detection sensor 215, a vehicle control unit 220, an audio system control unit 225, and a display control unit 230 may all be coupled to one another via the CAN bus 205. However, other forms of coupling the devices may be used. For example, the camera 210 and the lane detection sensor 215 may include first and second BLUETOOTH transceivers, respectively, both of which may be in communication with a third BLUETOOTH transceiver coupled to the CAN bus 205.

Figure 2B:
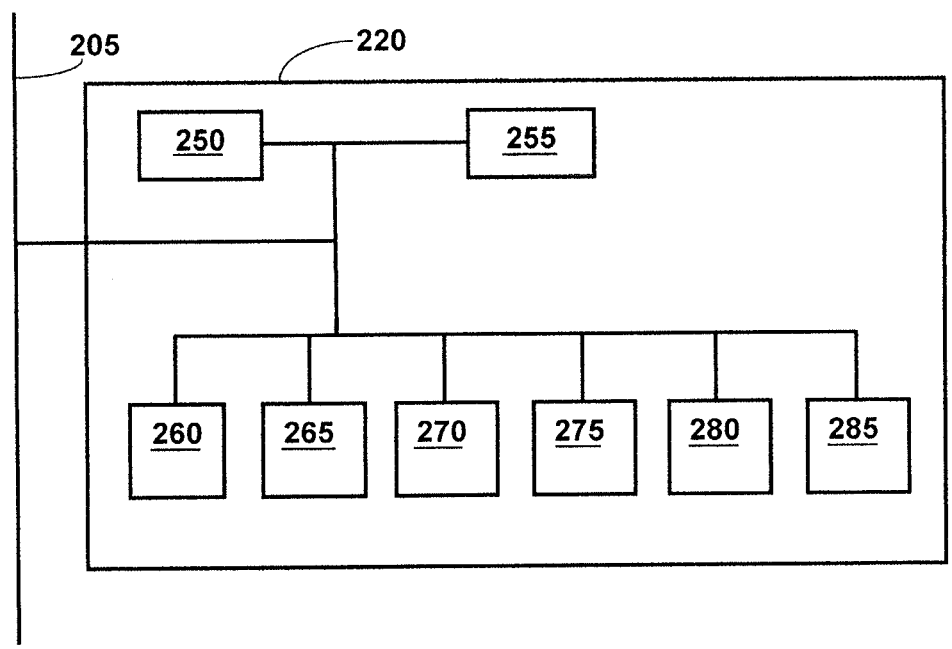
FIG. 2B illustrates a block diagram of a vehicle control unit according to one or more embodiments described herein.

FIG. 2B is a block diagram of a vehicle control unit (e.g., vehicle control unit 220). The vehicle control unit 220 may receive images of a pupil and/or related data (e.g., pupil size) from the camera 210 and may further receive images of the lane markers and/or related data (e.g., distance between the vehicle 100 and a lane marker, for example, lane markers 125-145) from the lane detection sensor 215. The vehicle control unit 220 may include a processor 250, a memory 255 (e.g., a physical memory such as a hard drive, EEPROM, FLASH, CD-ROM, RAM, DVD, and the like), a pupil size comparison module 260, a pupil size measurement module 265, a lane departure determination module 270, a steering data comparison module 275, a braking data comparison module 280 and a transceiver 285. While discussed as separate structural elements in one embodiment, one skilled in the art will understand that the components of the vehicle control unit 220 may be combined and/or integrated into fewer components, and/or separated such that some of these components are located in a separate device (e.g., at the camera 210 or the lane detection sensor 215). The function of these structural components will be discussed below in connection with FIGS. 3-5.

Figure 3A:
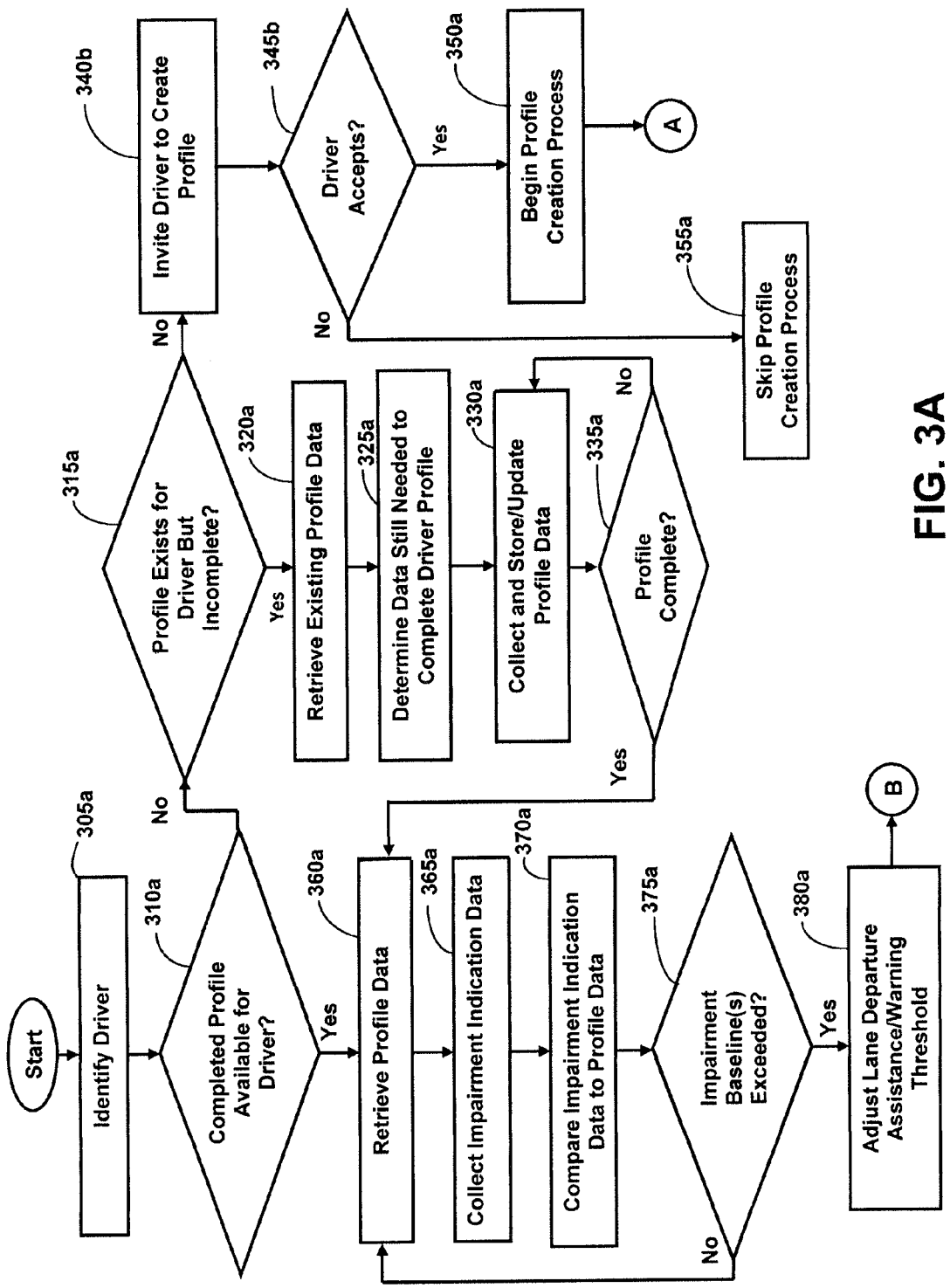
FIG. 3A illustrates a flow chart for a lane departure warning/assistance system according to one or more embodiments described herein.

Turning to FIG. 3A, a flow chart of an operation of a lane departure warning/assistance system (e.g., lane departure warning/assistance system 200, hereafter referred to as "the system 200") is illustrated. In one embodiment, the system 200 may comprise any and all components described in FIGS. 2A and 2B, among other components. In an embodiment, the process may start at step 305a, during which the driver may be identified by the system 200. One or more identification methods and systems known in the art may be employed to determine the identity of a driver, such as an identity of the key or a key fob, a biometric sensor, retinal recognition, or other method (e.g., prompting the driver to input a password or select options among a menu of driver names and IDs displayed at the start-up of the vehicle). Once the driver is identified as a known driver, the system 200 may determine whether a completed profile exists for the driver at step 310a.

If a completed profile is not available for the driver as determined at step 310a, the process moves to step 315a where a distinction between an incomplete profile and a non-existent profile is made by the processor (e.g., the processor 250). If the processor (e.g., the processor 250) determines that the profile is incomplete, the existing profile data is retrieved in step 320a. At step 325a, the data still needed to complete the profile is determined by the system 200 (e.g., by the processor 250 of the system 200) and as the driver operates the vehicle, the needed data is collected and stored at step 330a. At step 335a, if the profile is determined to be complete, the system 200 may, in one embodiment, cease to collect information or data for the profile and may begin to obtain data to determine whether the driver may benefit from lane departure assistance (e.g., as shown in FIG. 3 by moving the process along to step 370*a*).

For situations where a profile does not exist as determined by step 315*a*, the system 200 may invite the driver to create a profile at step 340*a*. If the driver accepts the invitation at step 345*a*, the profile creation process begins at step 350*a*, which is more fully described in FIG. 4. However, if the driver declines the invitation at step 345*a*, the profile creation process may be skipped at step 355*a*, and the lane departure warning/assistance feature of the lane departure detector remains in a deactivated state. In one embodiment, the lane departure detector may be a subsystem of the lane departure warning/assistance system 200 and may include, but is not limited to, the processor 250, the memory 255, the lane detection sensor 215, the audio system control unit 225, the display control unit 230, and the lane departure determination module 270.

Referring back to step 310*a*, if a completed profile exists for the driver, then at step 360*a*, the system 200 may retrieve the driver's profile data from, for example, a memory connected to the bus 205. The profile data may include, among other information, pupil size, average braking force data, steering angle data, and the like. As the vehicle 100 is being operated, current data such as the pupil size of the driver, the average braking force data, or the steering angle data, is collected at step 365*a*. For example, to collect the pupil size of the driver, a camera (e.g., camera 210) may detect and take photos of the driver's eyes and send the image data to the vehicle control unit (e.g., vehicle control unit 220) where the image may be processed to determine the pupil size. In one embodiment, a pupil measuring apparatus (e.g., pupil size measurement module 265) may measure and/or calculate the diameter of a driver's pupil from an image of the eye obtained from the camera (e.g., camera 210). At step 370*a*, the measured or calculated pupil diameter and the pupil diameter saved in the profile may be transmitted to a pupil size comparison module 260 (e.g., a pupil diameter comparison module) for comparison. At step 375*a*, if the pupil size comparison module 260 determines that a difference in the diameter sizes deviates too far from a certain pupil size baseline, the lane departure warning/assistance feature (of for example, the lane departure detector) may be activated at step 380*a*. For example, when the measured or calculated pupil diameter deviates by more than a pupil size deviation level (e.g., 5%) from the pupil diameter saved in the profile, a processor (e.g., processor 250) may activate the lane departure warning/assistance feature, as the driver is deemed to be impaired or intoxicated and thus, may benefit from the lane departure warning/assistance. While this example uses a 5% deviation, other pupil size deviations levels may be implemented, such as 6%, 6.5%, or any value between 0-50%. In an embodiment, the pupil size deviation level may be a fixed value or percentage. In an embodiment, the pupil size deviation level may further be adjusted based on learned data about the driver. However, if the system 200 determines that the pupil size baseline has not been exceeded in step 375*a*, the process may return to step 365*a* and the size of the driver's pupil(s) may be collected and analyzed again.

Continuing to analyze the driver's pupil may guard against the scenario where the driver consumes a large amount of alcohol shortly prior to operation of the vehicle 100 such that his or her pupils have not yet fully dilated or otherwise changed in size at the moment the vehicle 100 initially processes the size of the pupil. By repeating the collection and analysis processes, the system 200 is able to take into account any further change in the size of the pupil due to the absorption of alcohol or drugs thereby achieving a more accurate assessment of whether the driver is intoxicated.

For simplicity, steps 365*a* and 370*a* have been described with respect to pupil differences. However, in one embodiment, as further described in FIG. 5, even if the pupil size comparison fails to suggest that the driver is intoxicated, other driving data may be used to infer that the driver is impaired and may benefit from lane departure warning/assistance when the collected data (e.g., steering angles and braking forces) indicate driving patterns outside the norm. In an embodiment, the system 200 may analyze a combination of pupil size and driving/maneuvering patterns to determine whether the driver is impaired. For example, field studies have shown that excessive steering angle maneuvers, sharp vehicle maneuvers, and high braking g-force braking (e.g., more than 0.35 braking g-force for non-emergency stopping or slowing down maneuvers) are potential signs of driver impairment. As such, a combination of one or more of driving patterns and pupil size may be compared to one or more corresponding baselines to determine whether the driver is impaired. In one embodiment, a combination of one or more of (a) steering angle maneuvers beyond a steering baseline, (b) amount of braking force beyond a braking baseline (e.g., 0.35 g force), (c) a pupil size beyond a pupil size baseline (e.g., 3-4 millimeters), (d) a number of lane marking crossings beyond a crossing baseline, and (e) other driving or maneuvering patterns (including but not limited to weaving, sharp turning, erratic braking, etc.) may be analyzed to determine whether the driver is impaired.

In one embodiment, and in an exercise of caution, once the driver is determined to be legally intoxicated (e.g., the corresponding baseline(s) is/are determined to have been exceeded in step 375*a*), the driver may be deemed intoxicated for the remainder of the driving session (e.g., until the driver shuts off the engine) even if at some point during the driving session the driver recovers from an intoxicated state and returns to a non-intoxicated state.

In one embodiment, the lane departure warning/assistance feature may be deactivated after the system 200 determines that the driver is no longer intoxicated (i.e., by continuously monitoring pupil sizes and if the pupil size returns to a size below the pupil size baseline, de-activating the lane departure warning/assistance feature). In one embodiment, the lane departure detector and the lane departure warning/assistance feature remain activated regardless of the impairment determination, and the lane departure warning/assistance threshold is adjusted based on the impairment determination. In an embodiment, the lane departure warning threshold is different from the lane departure assistance threshold as disclosed above, and the system adjusts the lane departure warning threshold and/or lane departure assistance threshold.

In one embodiment, when the driver is above legally allowable limits of intoxication, the vehicle 100 may be shut down. For example, the driver may be warned that the engine of vehicle 100 is going to be shut down, and the driver may be given a short amount of time, such as thirty seconds, to move the vehicle 100 over to the shoulder of the road or a parking space. In one embodiment, the vehicle 100 may decrease five mph in speed every thirty seconds to promote a safe driving experience. Contemporaneously, the emergency lights of the vehicle may be activated to alert other drivers on the road. Such an embodiment may be used in conjunction with the other concepts described herein.

In an embodiment, the system 200 is not activated or de-activated based on the impairment determination. In one embodiment, the system 200 remains activated during operation of the vehicle.

Figure 3B:
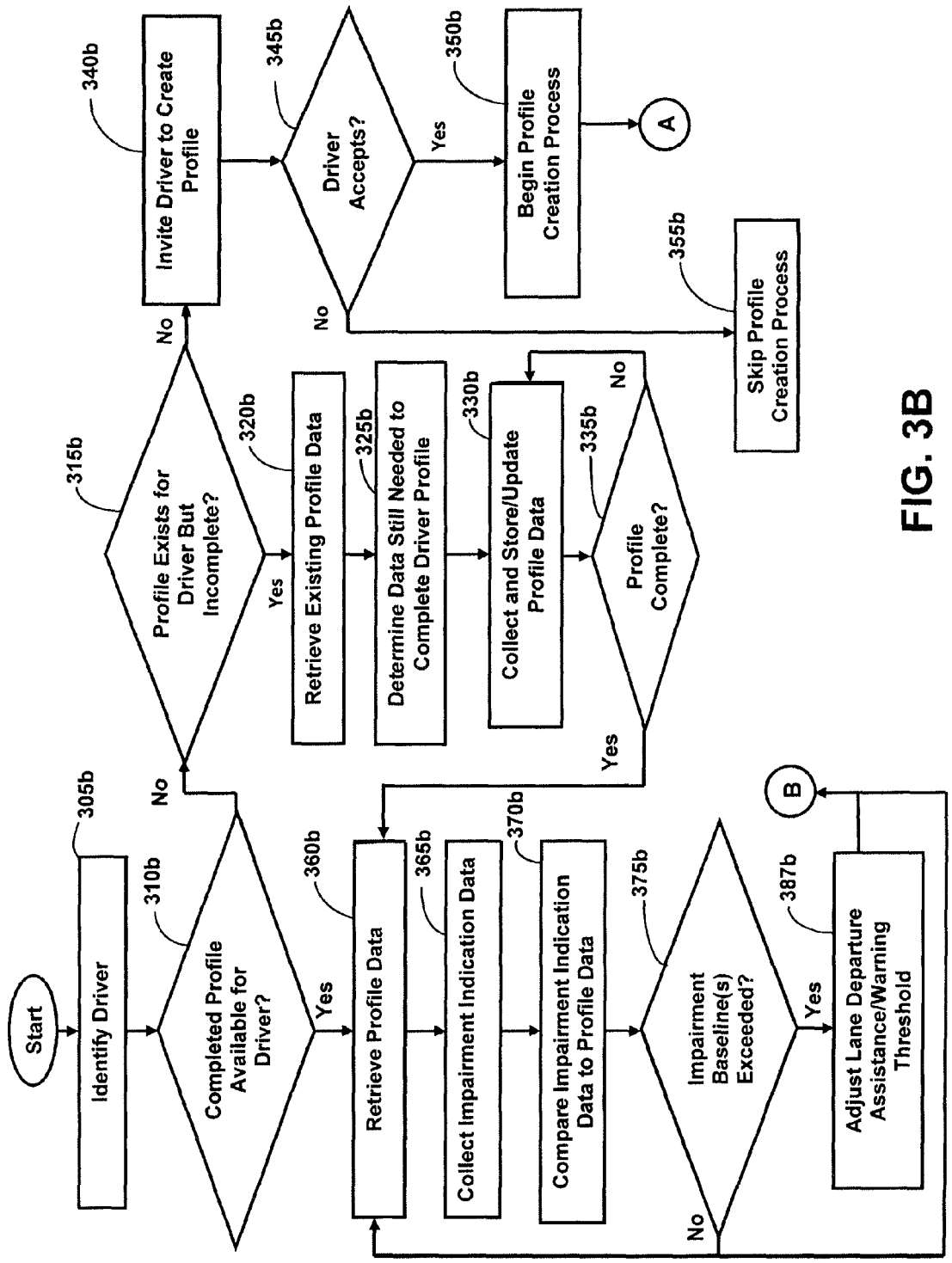
FIG. 3B illustrates a flow chart for adjusting a lane departure warning/assistance threshold of a lane departure warning/assistance system according to one or more embodiments described herein.

Referring to FIG. 3B, a flow chart of an operation of the system 200 is illustrated. In one embodiment, steps 305b, 310b, 315b, 320b, 325b, 330b, 335b, 340b, 345b, 350b, 355b, 360b, 365b, 370b, and 375b are performed similarly to steps 305a, 310a, 315a, 320a, 325a, 330a, 335a, 340a, 345a, 350a, 355a, 360a, 365a, 370a, and 375a disclosed above, respectively. In an embodiment, when the system 200 determines that the impairment baseline(s) (e.g., one or more of the pupil size baseline, braking baseline, steering baseline, etc.) is/are exceeded (for example, as determined in step 375b) beyond the corresponding deviation level(s), the lane departure warning/assistance threshold is adjusted as shown in step 387b.

The system 200 determines whether to provide lane departure warning/assistance by analyzing the position of the vehicle with respect to the lane markings based on the adjusted lane departure warning/assistance threshold of step 387b. In an embodiment, the system 200 may further utilize the determined vehicle dynamics in reaching the determination.

For example, in an embodiment, the lane departure warning/assistance threshold may be an encroachment distance threshold such that when a distance between a reference point (e.g., a location of the vehicle or the lane detection sensor 115 or 215) and a lane marking drops below the encroachment threshold, lane departure warning is issued and/or lane departure assistance is provided. In an embodiment, the system 200 identifies a point of reference (e.g., the location of the lane detection sensor 115 or 215) corresponding to a first lane marker, and a point of reference corresponding to a second, adjacent lane maker. The system 200 further calculates a first distance between the point of reference corresponding to the vehicle (e.g., the lane detection sensor 115 or 215) and the first lane marker and a second distance between the point of reference corresponding to the vehicle and the point of reference corresponding to the second, adjacent lane marker. The system 200 can then determine that the vehicle is encroaching the edge of the lane of a road when one of the first distance and second distance drops below the encroachment threshold (that is adjusted based on the impairment determination).

In an embodiment, when step 375b indicates that the driver is impaired, the lane departure warning/assistance threshold is adjusted such that the lane departure warning/assistance system provides lane departure warning/assistances at an early juncture, for example, by increasing a distance corresponding to the encroachment threshold. The encroachment threshold, for example, may be within the range of 5 to 35 centimeters. The encroachment threshold may be other values, percentages, or amounts without limiting the scope of the present invention.

In an embodiment, in step 387b, the lane departure warning/assistance threshold may be a Time-to-Lane-Crossing (TLC) threshold that may correspond to a time period that the system 200 estimates/predicts is remaining before the vehicle crosses a lane marking. In an embodiment, when a currently estimated/predicted Time-to-Lane-Crossing is less than or equal to a TLC threshold, the system 200 issues warning or assistance. The system 200 adjusts the TLC threshold in step 387b based on the impairment determination in step 375b. In an embodiment, the TLC threshold is adjusted to be a longer time period when the driver is determined to be impaired as compared to when the driver is determined to be unimpaired, thereby warning or providing assistance to an impaired driver at an earlier juncture of time. In an embodiment, a combination of the encroachment threshold and the TLC threshold may be utilized for determining whether lane adjustment warning/assistance should be issued. The encroachment threshold and/or the TLC threshold may be adjusted based on the impairment determination. In other embodiments, other lane departure warning/assistance thresholds may be utilized in addition to or in lieu of the encroachment threshold and the TLC threshold. In an embodiment, after the driver is determined to be impaired, and if the system 200 determines (for example, in step 375b) that the driver is no longer impaired, the system 200 re-adjusts the lane departure warning/threshold to be more lenient accordingly.

Figure 3C:
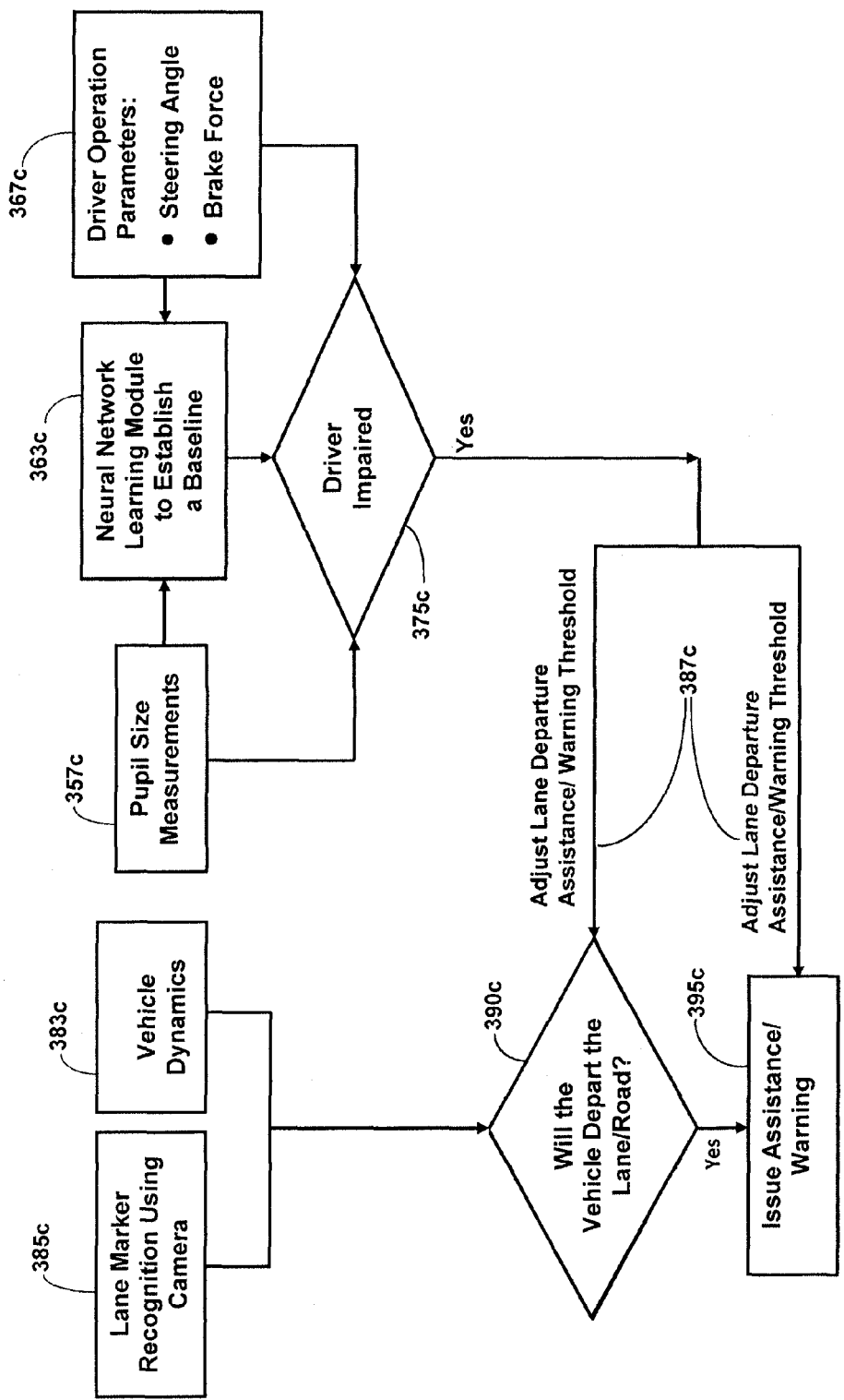
FIG. 3C illustrates a flow chart for adjusting a lane departure warning/assistance threshold of a lane departure warning/assistance system according to one or more embodiments described herein.

Referring to FIG. 3C, a flow chart of an operation of the system 200 is illustrated. In step 357c, the system 200 performs pupil size measurements as disclosed above and further disclosed below with respect to FIGS. 5A and 5B. In step 367c, the system 200 determines driver operation parameters corresponding to steering angle and braking force as disclosed above and further disclosed below with respect to FIGS. 5A and 5B. In step 363c, a neural network learning module is utilized to establish corresponding baselines for the measured parameters. In step 383c, the system 200 determines vehicle dynamics, for example, using driving, maneuvering, braking, steering, or other driving/maneuvering data as disclosed above. In step 385c, the position of lane markers, the position of a reference position, and/or distances of the reference point to the lane markers are determined as disclosed above with respect to FIG. 1B. In step 375c, pupil size and/or driving patterns are compared to the corresponding baselines to determine whether the driver is to be treated as being impaired. The collection, establishment of baselines, and comparison are disclosed below with respect to FIGS. 4, 5A and 5B. When the driver is treated as being impaired, the system 200 may adjust the lane departure warning/assistance threshold. In an embodiment, the process performed in step 387c may be similar to the process disclosed above with respect to step 387b. In step 390c, the system 200 determines whether the vehicle 100 will depart the lane/road based on the vehicle dynamics determined in step 383c and the lane marker recognition in step 385c. In step 395c, when it is determined that the vehicle 100 will depart the lane/road, the system 200 may issue lane departure warning/assistance based on the adjusted lane departure warning/assistance threshold, respectively.

Figure 4:
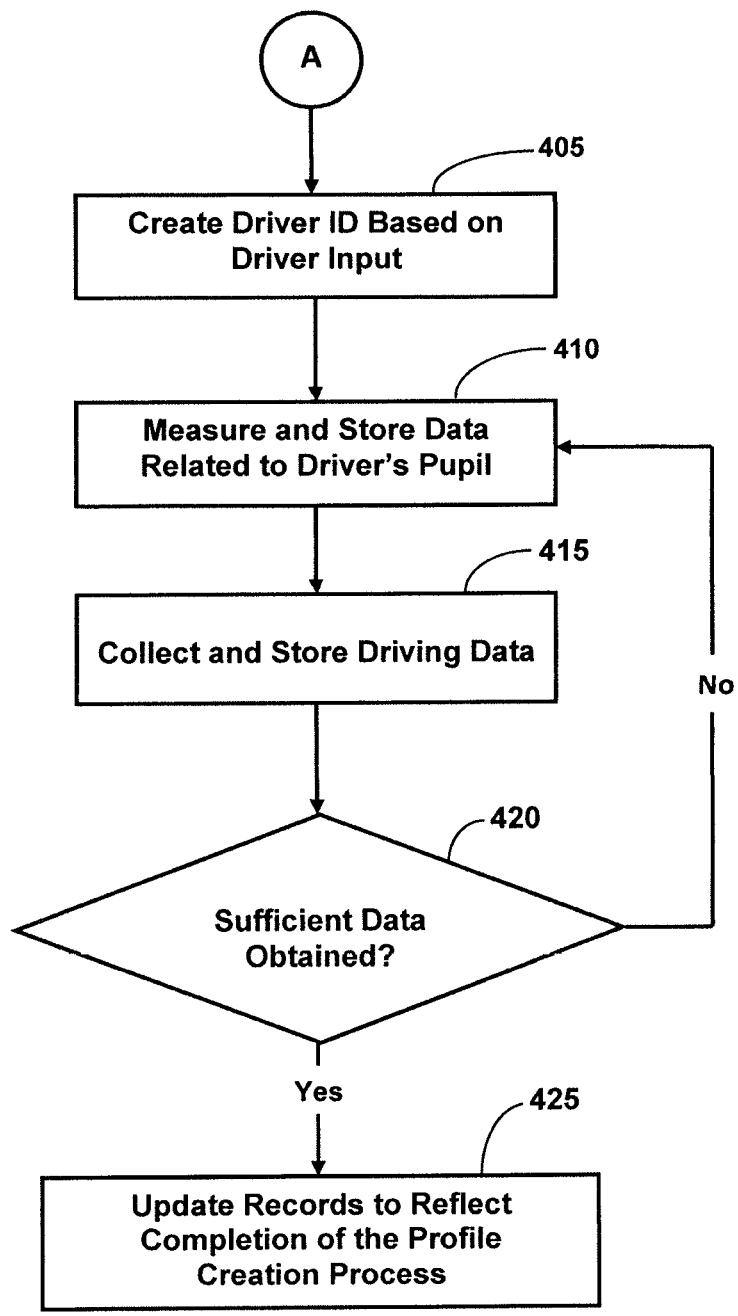
FIG. 4 illustrates a flow chart of a profile creation process related to a lane departure warning/assistance system according to one or more embodiments described herein.

FIG. 4 illustrates a flow chart depicting one embodiment of a profile creation process. At step 405, a driver identification is created. The driver identification may be created based on the input of an alphanumeric pass code or via a biometric reading (e.g., fingerprint or voice-print). At step 410, the driver's pupil may be measured and stored as a pupil size baseline. The diameter of the pupil of the driver's right or left eye, or the diameters corresponding to both pupils of the driver's eyes may be measured. At step 415, statistical data of the driver's driving patterns may be collected as the driver operates the vehicle 100. For example, the processor 250 may measure the speed of the vehicle 100 and steering force applied as the vehicle 100 makes turns. The processor 250 may store in the memory 255 data related to how "hard" or "soft" the driver typically makes turns on the road. For example, some drivers may slow the vehicle 100 to almost a complete stop before making a turn, while other drivers may aggressively steer the vehicle 100 when approaching a turn which may result in sharper turns. Such data may be taken over a span of tens or hundreds of miles to establish the patterns of a driver.

In another example, braking force may be measured each time the vehicle 100 decelerates. Obtaining samples of braking force applied yields a more comprehensive picture of how the driver typically utilizes the brakes in operating the vehicle 100. Certain drivers may ease into the brakes and slow the vehicle 100 over a longer period of time and/or distance, while other drivers may consistently wait and slam on the brakes closer to when braking of the vehicle 100 is absolutely needed to prevent an accident. These patterns may be determined by collecting samples over a substantial period of driving time and may be used, in one embodiment, to assist in ascertaining whether the driver is impaired.

Other examples of driving data collected may include the time of day the vehicle 100 is being operated by the driver, the average speed of the vehicle 100, and the like. More particularly, the time of day the vehicle 100 is being operated may be correlated with other data collected such as braking force applied and steering angle data to assist in determining whether the driver is impaired. For example, if a driver tends to drive more carefully (e.g., longer braking spans, lower vehicle speeds, etc.) late at night compared to the daytime, such factors may be taken into account when determining whether the driver is impaired. In an embodiment, impairment determination baselines for a specific driver are established for the driving/maneuvering patterns and pupil size. For example, a pupil size baseline for the pupil size may be determined to be between 3 to 4 millimeters. In an embodiment, when a new driver uses the lane departure system, new corresponding baselines are established for the new driver based on new learned driving pattern and/or pupil size data.

Referring back to FIG. 4, once sufficient data is obtained by the system 200 at step 420, the profile creation process is completed and the profile is marked as such at step 425. By completing the profile, the next time the driver operates the vehicle 100, the system 200 may collect impairment indication data (e.g., in one embodiment, the same data collected to establish the profile) and compare the impairment indication data to the profile data to determine whether the driver is intoxicated.

Figure 5A:
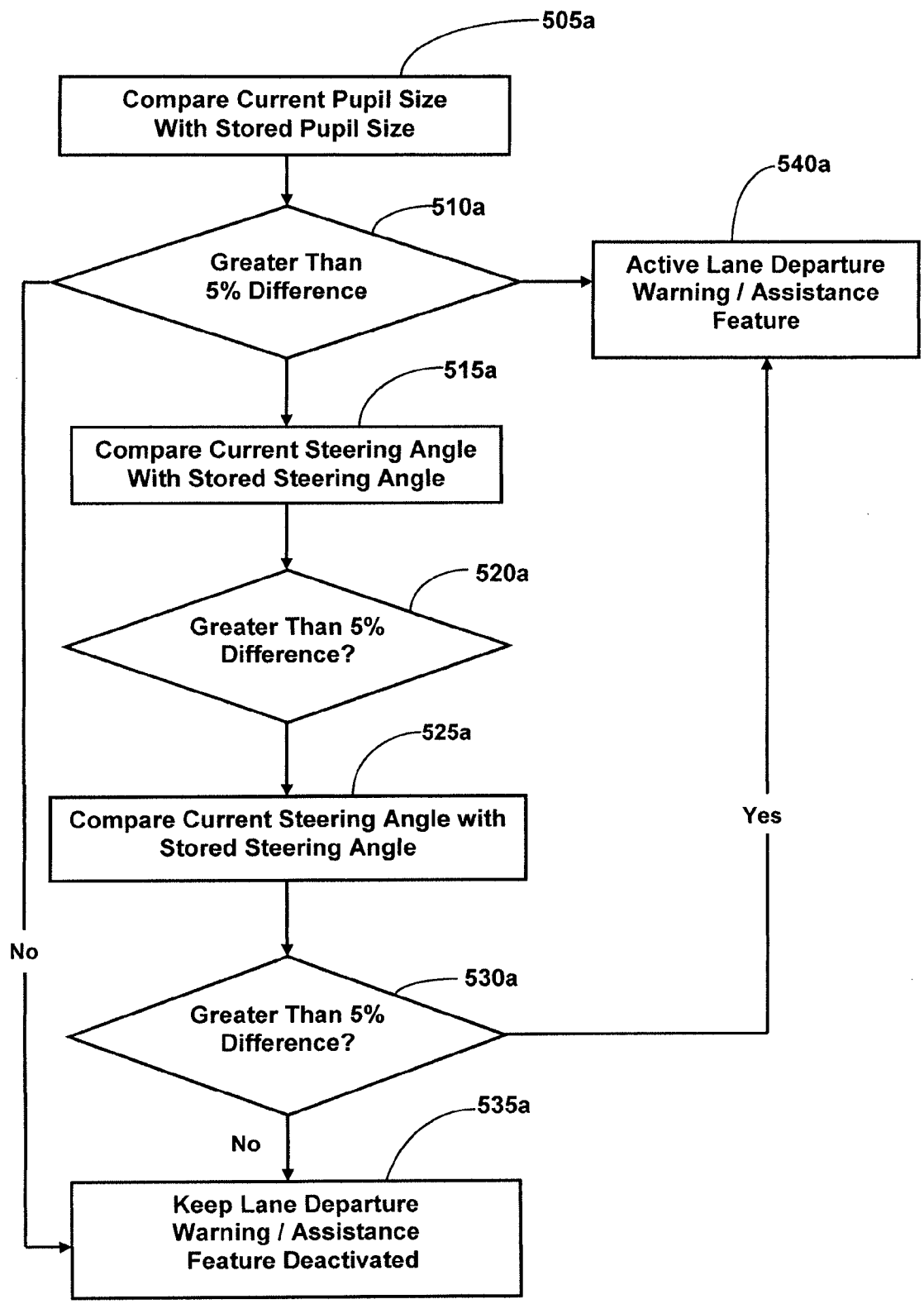
FIG. 5A illustrates a flow chart of an intoxication determination process as related to a lane departure warning/assistance system according to one or more embodiments described herein.

FIG. 5A illustrates one example of determining whether the driver is impaired by using the collected impairment indication data. At step 505*a*, the currently measured pupil size may be compared with the pupil size data stored in a memory connected to the bus 205. In one example, the pupil size data collected and compared may be of one eye or both eyes. At step 510*a*, the system 200 determines if the difference between the pupil size of the currently measured pupil and the stored pupil data exceeds beyond a pupil size deviation level (e.g., 5%). In one embodiment, where both pupils of the driver is measured, each pupil may need to be 5% longer or shorter than the respectively stored pupil sizes before the process moves to step 540. If the pupil size fails to exceed the pupil size baseline by more than the pupil size deviation level as determined in step 510, the process moves to step 515, where the braking force (e.g., average braking force of the current driving session) is compared to the stored braking baseline data (e.g., average braking force recorded in the profile data). In one example, the braking data comparison module 280 may receive braking baseline data from a memory connected to the bus 205 regarding the average braking force stored for the profile and may receive data from the processor 250 regarding the average braking force of the current driving session. The braking data comparison module 280 may compare the two average values to determine whether a greater than a braking deviation level (e.g., 5% difference) exists between the two values at step 520. If so, the process may move to step 525*a* where the current steering angle data (e.g., average steering angle for turns and/or curves of the current driving session) is compared to the stored steering baseline data (e.g., average steering angle for turns and/or curves recorded in the profile data). In one example, the steering data comparison module 275 may receive data from memory 255 regarding the average steering angle stored for the profile (serving as a steering baseline) and may receive data from the processor 250 regarding the steering angle of the current driving session. The steering data comparison module 275 may then compare the two average values to determine whether a greater than a steering deviation level (e.g., 5% difference) exists between the two values at step 530*a*. If the result is affirmative, the lane departure warning/assistance feature of the lane departure detector may be activated at step 540*a*; otherwise the lane departure warning/assistance feature remains deactivated. Once the lane departure warning/assistance feature is activated, the driver may be warned each time the vehicle veers too close to the lane markers of the current lane in which the vehicle is traveling. In an embodiment, the lane departure detector remains activated regardless of steps 505*a*-530*a*, yet the lane departure warning/assistance is activated based on steps 505*a*-530*a*. In an embodiment, the lane departure warning/assistance threshold is adjusted based on steps 505*a*-530*a*.

Figure 5B:
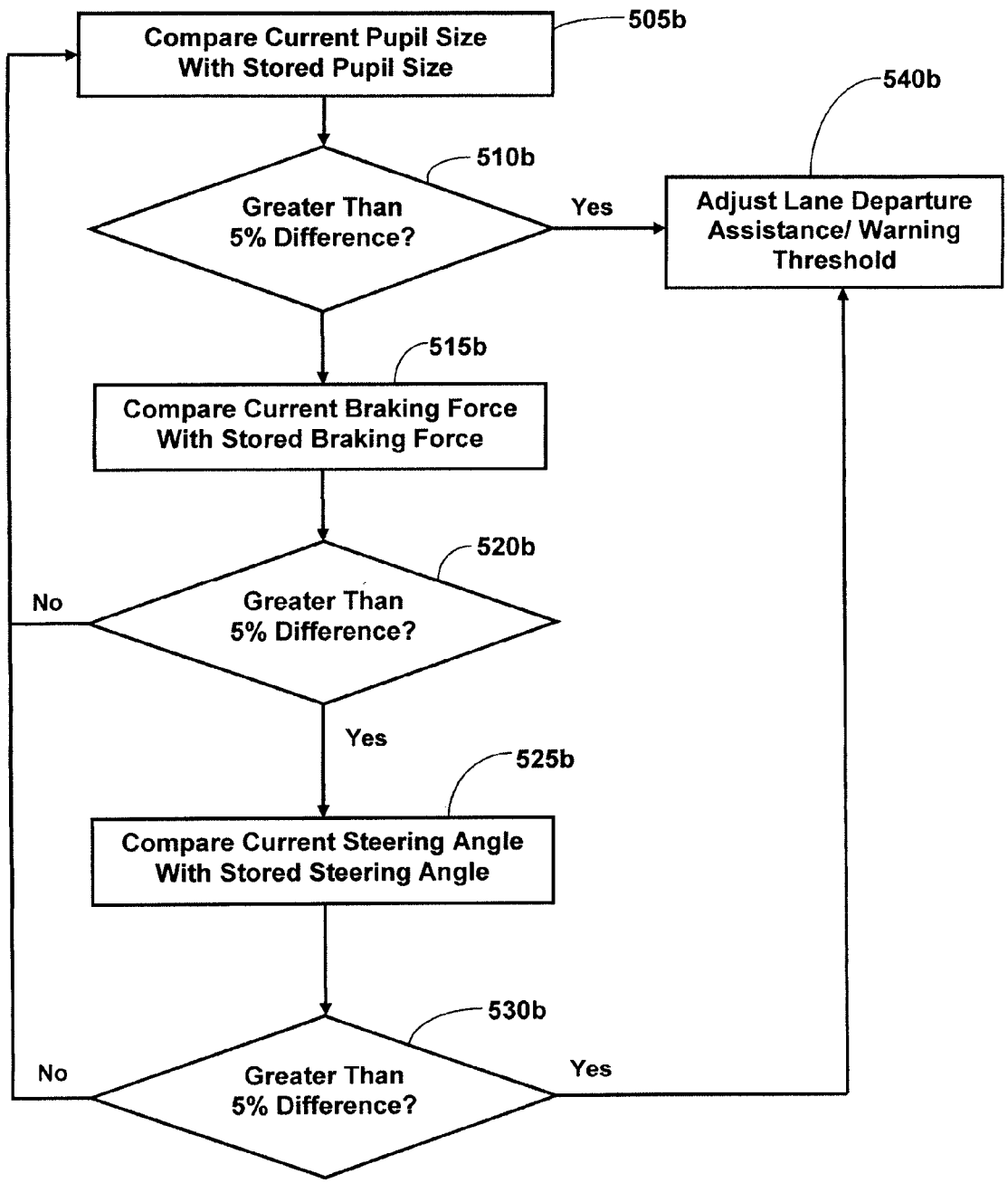
FIG. 5B illustrates a flow chart of an intoxication determination process and an adjustment of a lane departure warning/assistance threshold as related to a lane departure warning/assistance system according to one or more embodiments described herein.

FIG. 5B illustrates determining whether the driver is impaired by using the collected impairment indication data according to one or more embodiments of the present invention. In one embodiment, steps 505*b*, 510*b*, 515*b*, 520*b*, 525*b*, and 530*b* are performed similar to steps 505*a*, 510*a*, 515*a*, 520*a*, 525*a*, and 530*a*, respectively, as disclosed above. In step 540*b*, when the current pupil size and the current steering angle are determined to be exceeding the corresponding baselines beyond the corresponding deviation levels (e.g., 5%), the lane departure warning/assistance threshold of the lane departure warning/assistance system is adjusted. For example, in one embodiment, the lane departure warning/assistance threshold may be an encroachment threshold such that when a distance between a reference point (e.g., a location of the vehicle or the lane detection sensor 115 or 215) and a lane marking drops below the encroachment threshold, lane departure warning is issued and/or lane departure assistance is provided. In an embodiment, when steps 510*b* and/or 530*b* indicate that the driver is not impaired, the lane departure warning/assistance threshold is adjusted such that the lane departure warning/assistance system avoids false lane departure warning/assistances, for example, by adjusting the encroachment threshold to be more lenient. Similarly, when steps 510*b* and/or 530*b* indicate that the driver is impaired, the lane departure warning/assistance threshold is adjusted such that the lane departure warning/assistance system provides lane departure warning/assistances at an earlier juncture, for example, by adjusting the encroachment threshold to be less lenient (e.g., by increasing the time period corresponding to a TLC threshold and/or increasing the distance corresponding to an encroachment threshold). Other combinations of thresholds may be utilized and adjusted as disclosed above with respect to FIG. 3B.

Figure 6A:
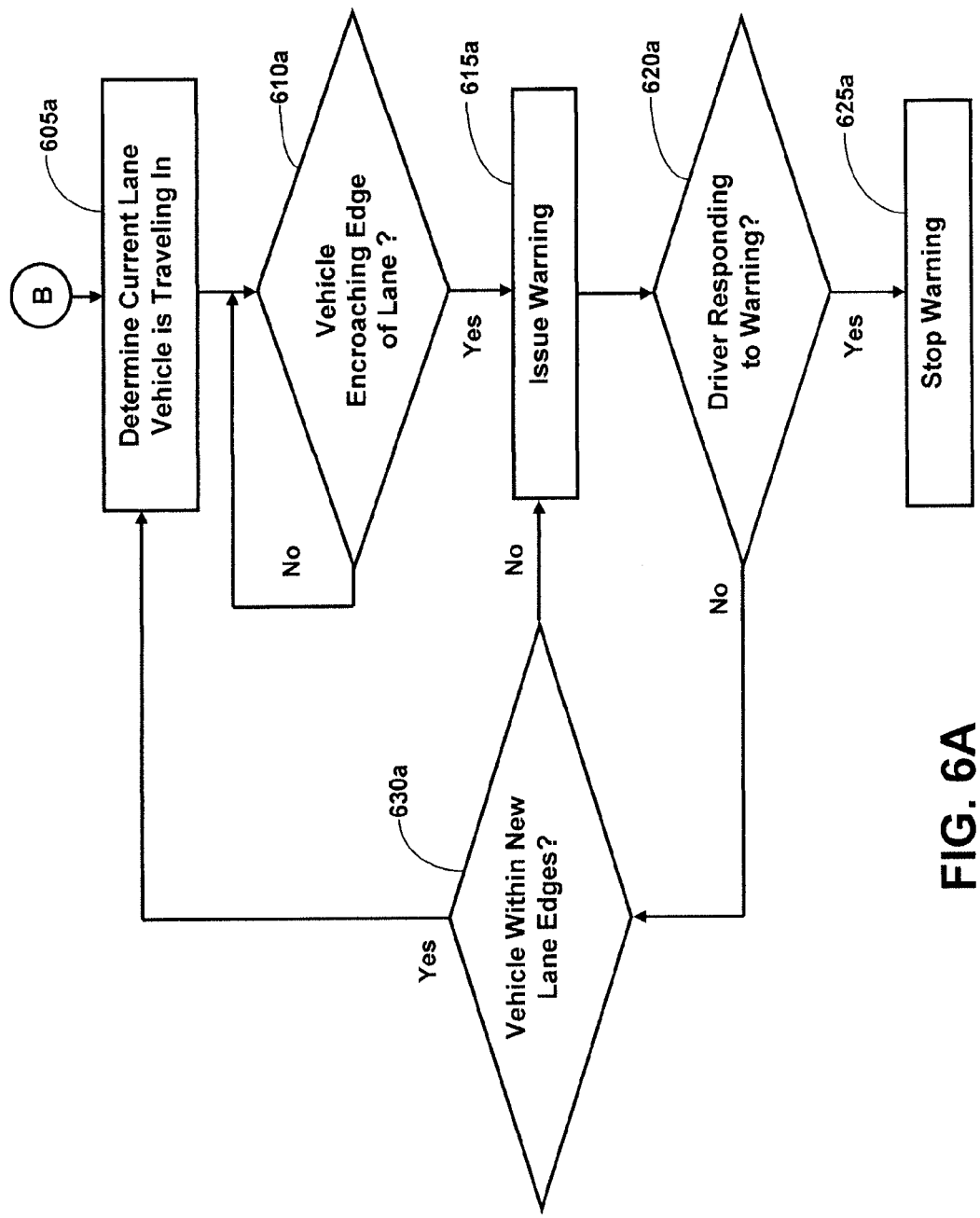
FIG. 6A illustrates a flow chart of an operation of a lane departure detector as related to a lane departure warning/assistance system according to one or more embodiments described herein.

FIG. 6A is a flow chart of the operation of the lane departure detector. As discussed above, in one embodiment, the lane departure detector may be a subsystem of the lane departure warning/assistance system 200. One skilled in the art will appreciate that other processors, memories, and the like may be further included and/or dedicated to performing certain steps of the lane departure detector.

At step 605a, the lane departure detector determines the current lane that the vehicle is traveling in, for example, by using lane detection sensors (e.g., lane detection sensor 215) to ascertain the lane markers to the left and the right of the vehicle 100, respectively. Once the lane markers are determined, the lane departure determination module 270 may calculate a distance between the tire of the vehicle 100 closest to the lane marker and the lane marker itself. At step 610a, the lane departure determination module 270 may ascertain whether the vehicle 100 is encroaching too closely to the edge of the lane based on the calculated distance in comparison to a lane departure warning/assistance threshold or further in combination with other factors. Other factors that may be taken into account include, for example, whether the vehicle 100 is turning on a curved portion of a road (e.g., the lane departure determination module 270 may allow the vehicle 100 to encroach closer to the edge of the lane before triggering a warning or providing assistance than if the vehicle 100 were on a straight portion of the lane), the speed of the vehicle 100 (e.g., at lower speeds, the lane departure determination module 270 may allow the vehicle 100 to encroach closer to the edge of the lane before triggering a warning or providing assistance), the width of the lane (e.g., with a narrower lane, the lane departure determination module 270 may allow the vehicle 100 to encroach closer to the edge of the lane before triggering a warning or providing assistance), time of day (daytime vs. night time), weather (e.g., cold, icy conditions as opposed to a clear, sunny day), among other factors. The lane departure determination module 270 may continue to monitor whether the vehicle 100 is too close to either one of the two closest lane markers (e.g., lane markers 125 and 130 of FIG. 1B). Once the lane departure determination module (e.g., a lane departure determination module 270) determines that the vehicle 100 is encroaching too closely to the lane marker (e.g., lane markers 125 and 130 of FIG. 1B) at step 610a in comparison to the lane departure warning/assistance threshold, a warning may be issued to the driver through the audio and/or display systems (e.g., using an audio and/or display output controlled by the audio system control unit 225 and/or the display control unit 230, respectively) of the vehicle 100 at step 615a. Typically for non-intoxicated drivers, the system 200 may warn the driver when the vehicle 100 actually crosses the lane marker (e.g., lane markers 125 and 130 of FIG. 1B) as to avoid overly annoying the driver each time the driver moves too close to the lane markers (e.g., lane markers 125 and 130 of FIG. 1B).

Referring to FIG. 6A, after the warning (e.g., warning 710 or 715 disclosed below with respect to FIG. 7) is issued in step 615a, if the driver responds to the warning (e.g., warning 710 or 715) at step 620a (e.g., by moving back the vehicle 100 towards the center of the lane), the warning (e.g., warning 710 or 715) may be stopped in step 625a. However, if the driver fails to respond to the warning (e.g., warning 710 or 715), at step 630a, the lane departure determination module 270 may determine whether the vehicle 100 is within new lane markers. If not, the warning (e.g., warning 710 or 715) may continue to be outputted. However, if the vehicle 100 is determined to be in a new lane, the process reverts back to step 605a.

In one embodiment, the processor 250 may perform an additional step of checking the activation of the turn signal before issuing the warning (e.g., warning 710 or 715) or before providing assistance. If the turn signal is activated, the lane departure warning (e.g., warning 710 or 715) might not be given and lane departure assistance may not be provided since it is likely that the driver actually intends to exit the current lane and hence, the vehicle 100 would necessarily encroach and cross over the lane marker.

Figure 6B:
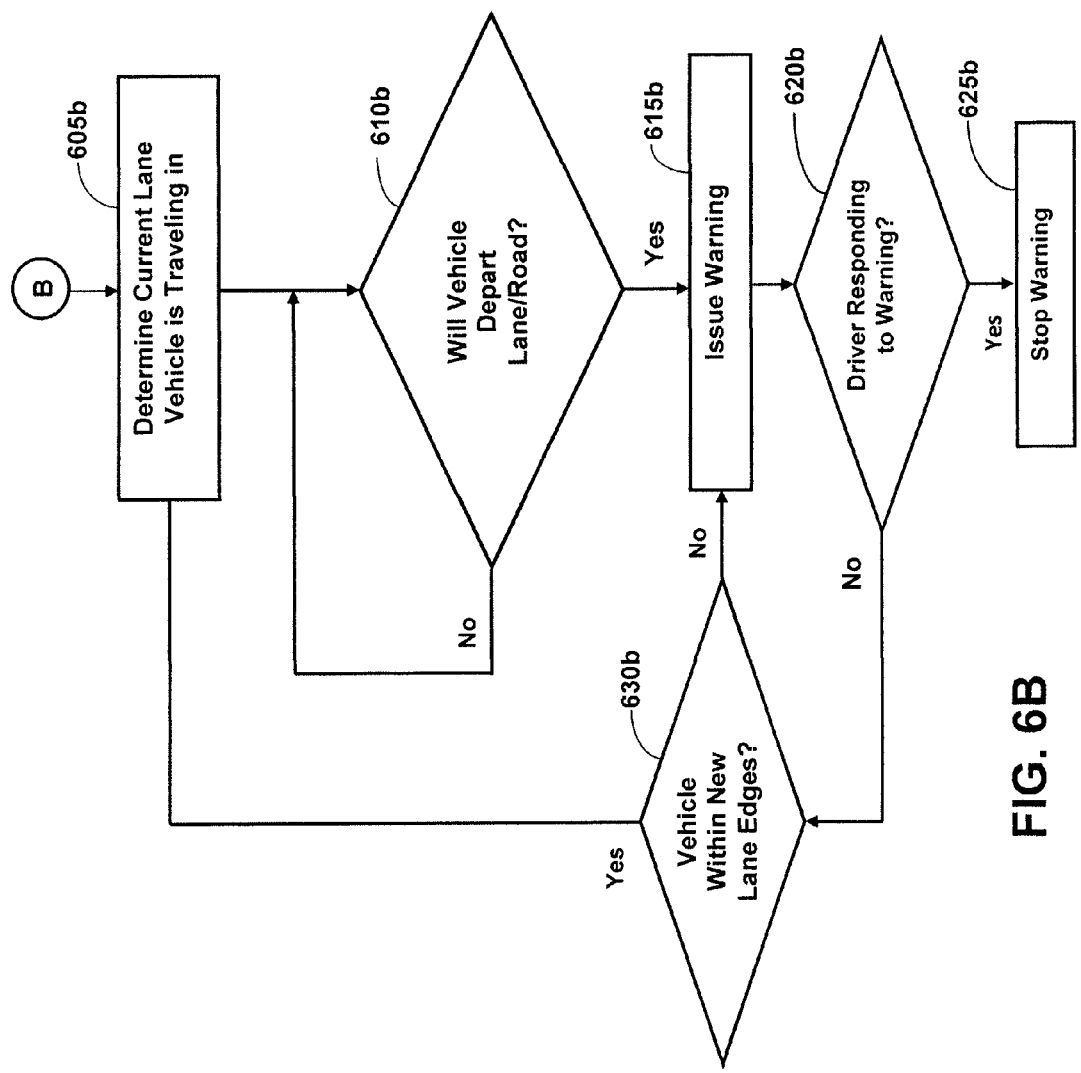
FIG. 6B illustrates a flow chart of an operation of a lane departure detector as related to a lane departure warning/assistance system according to one or more embodiments described herein.

FIG. 6B is a flow chart of the operation of the lane departure detector. In step 605b, the system 200 may determine the current lane the vehicle is travelling in as disclosed above with respect to step 605a. The system 200 determines whether the vehicle will depart from the lane based on the lane departure warning/assistance threshold that is adjusted based on the impairment determination. For example, in one embodiment, the lane departure warning/assistance threshold may be an encroachment threshold as disclosed above with respect to FIG. 3B, and in step 610b, the distance between a reference point on the vehicle (e.g., a location of the lane detection sensor 115 or 215) to a lane marker may be analyzed in reference to the encroachment threshold. Steps 615b, 620b, 625b and 630b may be performed similar to steps 615a, 620a, 625a and 630b disclosed above.

Figure 7:
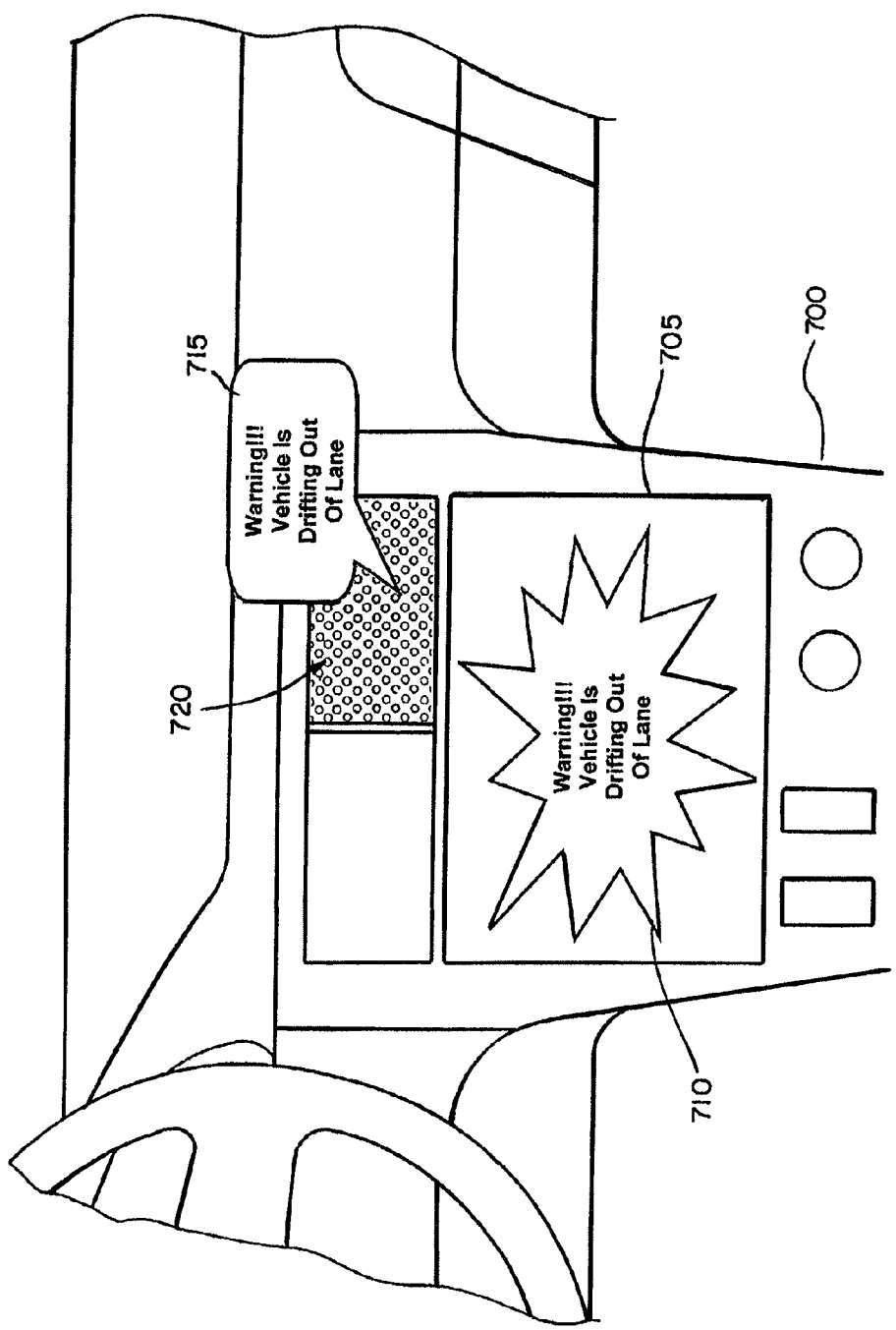
FIG. 7 illustrates a visual display and an audio warning as related to a lane departure warning system/assistance according to one or more embodiments described herein.

FIG. 7 illustrates an example of a visual and/or audio warning. The center console 700 for a vehicle 100 may include a display 705 and speakers 720. A visual warning message 710 may be displayed, and an audio warning message 715 (e.g., conveying the same message as the visual warning message 710) may be audibly played either simultaneously or contemporaneous to each other. The visual warning message 710 may flash, change colors, use large fonts, and/or otherwise convey the visual warning message 710 to the driver in an effective manner. Alternatively, the driver may configure the system to issue warnings (e.g., the visual warning message 710 or the audio warning message 715) via only one of the two outputs (e.g., the speakers 720 or the display 705).

With respect to the audible warning 715 issued through the speakers 720, other examples of warning sounds may include, for example, a noise normally heard when a vehicle drives over a rumble strip (e.g., a periodic "rumble" sound). In one embodiment, the speaker closest to the lane marker encroached may be utilized to output the sound to provide the driver a directional sound so the driver may easily ascertain which lane marker the vehicle 100 is encroaching (not shown). In one embodiment, the warning message or sound (e.g., the visual warning message 710 or the audio warning message 715) may have priority over any audible message currently being played through the speakers 720 (e.g., songs on the radio or from the CD player, navigation commands from a GPS, and the like). Furthermore, the decibel level for the message may be preset such that even if the current decibel output level of the speakers 720 is higher or lower than the preset level for the message, the speakers 720 may automatically adjust to the preset decibel level for the message for outputting of the message, before returning to the previous decibel level.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method comprising:
    identifying a driver of a vehicle;
    storing, in a memory, a profile having a driver identification of the driver and profile data including pupil size baseline data corresponding to a stored pupil size of the driver during a previous driving session, braking baseline data corresponding to stored braking operations of the driver and steering baseline data including an average steering angle of stored steering operations of the driver;
    detecting, using at least one sensor or camera, impairment indication data during a current driving session of the driver including pupil size data corresponding to a current pupil size of the driver during the current driving session, braking data for the current driving session of the driver, and steering data corresponding to the current driving session of the driver;
    determining, by a vehicle control unit, that the driver is impaired by comparing the impairment indication data to the profile data including comparing the pupil size data to the pupil size baseline data, the braking data for the current driving session to the braking baseline data corresponding to the stored braking operations and an average steering angle from the steering data of the current driving session to the average steering angle included in the steering baseline data;
    determining that a deviation between the braking data and the braking baseline data is greater than a first threshold deviation and that a deviation between the average steering angle of the current driving session and the average steering angle included in the steering baseline data is greater than a second threshold deviation; and
    adjusting, by the vehicle control unit, a lane departure warning/assistance threshold in response to determining that the deviation between the braking data and the braking baseline data is greater than the first threshold deviation and that the deviation between the average steering angle of the current driving session and the average steering angle included in the steering baseline data is greater than the second threshold deviation.

2. The method of claim 1 further comprising:
    determining that the driver is a new driver;
    inviting the driver to create a new profile;
    creating the new profile in response to receiving input indicating that the driver accepts the invitation;
    detecting and storing the pupil size baseline data;
    detecting and storing the braking baseline data; and
    detecting and storing the steering baseline data.

3. The method of claim 1 further comprising:
    determining that the driver is a known driver with an incomplete profile;
    retrieving the profile data corresponding to the incomplete profile from the memory;
    determining data needed to complete the incomplete profile; and
    detecting and storing the needed data.

4. The method of claim 1 further comprising outputting, by an output device, a warning or providing, via the output device, lane departure assistance based on the adjusted lane departure warning/assistance threshold, wherein outputting the warning includes at least one of displaying, on a vehicle display, a message indicating that the vehicle is encroaching an edge of a lane of the road, or playing, via a speaker, an audible message indicating that the vehicle is encroaching the edge of the lane of the road.

5. The method of claim 1 further comprising outputting, by an output device, a warning or providing, via the output device, lane departure assistance based on the adjusted lane departure warning/assistance threshold, wherein outputting the warning or providing the lane departure assistance comprises:
    identifying a vehicle point of reference corresponding to the vehicle;
    identifying a first point of reference corresponding to a first lane marker delimiting a first boundary of a lane of the road;
    identifying a second point of reference corresponding to a second lane maker delimiting a second boundary of the lane of a road;

calculating a first distance between the vehicle point of reference corresponding to the vehicle and the first point of reference corresponding to the first lane marker;

calculating a second distance between the vehicle point of reference corresponding to the vehicle and the second point of reference corresponding to the second lane marker; and determining that the vehicle is encroaching the first boundary or the second boundary of the lane when at least one of the first distance or the second distance is less than or equal to a distance corresponding to the adjusted lane departure warning/assistance threshold.

6. The method of claim 5 wherein identifying the first point of reference corresponding to the first lane marker is performed by a first camera and identifying the second point of reference corresponding to the second lane marker is performed by at least one of the first camera or a second camera.

7. The method of claim 1 further comprising:
determining a current time-to-lane-crossing corresponding to a predicted time period remaining before the vehicle crosses a lane marker, wherein the lane departure warning/assistance threshold is a time-to-lane-crossing threshold; and outputting a warning or providing lane departure assistance when a current time-to-lane-crossing is less than or equal to the time-to-lane-crossing threshold.

8. The method of claim 1 wherein determining that the driver is impaired further comprises determining that the detected pupil size data deviates from the stored pupil size baseline data by more than a pupil size deviation level.

9. The method of claim 1 wherein the pupil size baseline data and the pupil size data are each detected using the camera and wherein the camera is located within an interior of the vehicle.

10. A device for providing lane departure warning or assistance to a driver of a vehicle, the device comprising:
a memory configured to store profile data corresponding to the driver including pupil size baseline data corresponding to a stored pupil size of the driver during a previous driving session, braking baseline data corresponding to a previous braking operation by the driver, and steering baseline data corresponding to a previous steering operation by the driver; and a processor connected to the memory and configured to:
determine a current pupil size of the driver during a current driving session based on image data,
compare the current pupil size of the driver during the current driving session to the pupil size baseline data that corresponds to the stored pupil size of the driver during the previous driving session,
compare current braking data corresponding to a current braking operation by the driver to the braking baseline data stored in the memory,
compare current steering data corresponding to a current steering operation by the driver to the steering baseline data stored in the memory, and
determine that the driver is impaired when at least one of the comparison of the current pupil size of the driver to the pupil size baseline data, the comparison of the current braking data to the braking baseline data stored in the memory, or the comparison of the current steering data to the steering baseline data stored in the memory indicates that the driver is impaired, until at least one of the vehicle is turned off or the comparison of the current pupil size to the pupil size baseline data, the comparison of the current braking data to the braking baseline data, or the comparison of the current steering data to the steering baseline data indicates that the driver is unimpaired, and adjust a lane departure warning/assistance threshold corresponding to at least one of a threshold distance to a lane marker or a predicted time period remaining before the vehicle crosses the lane marker when the driver is determined to be impaired.

11. The device of claim 10 wherein the lane departure warning/assistance threshold is the threshold distance to a first lane marker or a second lane marker delimiting a current lane of a road, the device further comprising:
a lane marker encroachment module configured to:
determine the current lane of the road that the vehicle is traveling in based on the first lane marker and the second lane marker,
determine when a distance between the vehicle and one of the first lane marker or the second lane marker is shorter than the threshold distance, and
generate a warning signal when the distance between the vehicle and one of the first lane marker or the second lane marker is shorter than the threshold distance.

12. The system of claim 10 wherein the lane departure warning/assistance threshold is adjusted to allow the vehicle to encroach closer to the lane marker as a portion of a road narrows than when the portion of the road widens.

13. The system of claim 10 wherein the lane departure warning/assistance threshold is adjusted to allow the vehicle to encroach closer to the lane marker as a speed of the vehicle decreases.

14. A system for providing lane departure warning or assistance to a driver of a vehicle, the system comprising:
a memory configured to store pupil size baseline data corresponding to a pupil size of the driver during a previous driving session and braking baseline data corresponding to a previous braking operation by the driver;

a first camera configured to be repositioned to track a pupil of the driver when the driver changes position relative to the first camera and to detect image data corresponding to the pupil of the driver that is usable to determine a current pupil size of the pupil of the driver during a current driving session;

a second sensor or camera configured to determine a distance between the vehicle and a lane marker;

a third sensor configured to detect current braking data corresponding to a current braking operation by the driver; and a vehicle control unit configured to:
compare the current pupil size of the driver during the current driving session to the pupil size baseline data,
compare the current braking data to the braking baseline data,
determine that the driver is impaired when at least one of the comparison of the current pupil size of the driver to the pupil size baseline data or the comparison of the current braking data to the braking baseline data indicate that the driver is impaired,
activate a lane departure warning/assistance feature having a lane departure warning/assistance threshold based on at least one of the comparison of the current pupil size of the driver to the pupil size baseline data and the current braking data to the braking baseline data, and adjust a lane departure warning/assistance threshold corresponding to at least one of the distance between the vehicle and the lane marker or a predicted time period remaining before the vehicle crosses the lane marker when the driver is determined to be impaired.

15. The system of claim 14 further comprising an audio control unit configured to output an audio message based on the distance between the vehicle and the lane marker and based on the adjusted lane departure/warning assistance threshold.

16. The system of claim 14 further comprising a display control unit configured to output a visual message based on the distance between the vehicle and the lane marker and based on the adjusted lane departure/warning assistance threshold.

17. The system of claim 14 further comprising a fourth sensor configured to detect current steering data corresponding to a current steering operation by the driver, wherein the memory is configured to store steering baseline data, the vehicle control unit is further configured to compare the current steering data to the steering baseline data, and determine that the driver is impaired further based on the comparison of the current steering data to the steering baseline data.

18. The system of claim 14 further comprising a steering wheel and wherein the first camera is positioned in proximity of the steering wheel.

19. The system of claim 14 wherein the first camera is configured to reposition itself to track the pupil of the driver.

20. The system of claim 14 wherein the vehicle control unit is further configured to start a timer in response to determining that the driver is impaired and to shut down the vehicle when the timer expires.

* * * * *